(12) United States Patent
Hagan (10) Patent No.: US 9,115,763 B2
(45) Date of Patent: Aug. 25, 2015

(54) TORQUE LIMITING ASSEMBLY (71) Applicant: Saint-Gobain Performance Plastics Corporation, Aurora, OH (US)

(72) Inventor: Timothy J. Hagan, Succasunna, NJ (US)

(73) Assignee: Saint-Gobain Performance Plastics Corporation, Aurora, OH (US)

( * ) Notice: Subject to any disclaimer, the term of this patent is extended or adjusted under 35 U.S.C. 154(b) by 0 days.

(21) Appl. No.: 14/132,846

(22) Filed: Dec. 18, 2013

(65) Prior Publication Data

US 2014/0187336 A1 Jul. 3, 2014

Related U.S. Application Data (60) Provisional application No. 61/748,008, filed on Dec. 31, 2012.

(51) Int. Cl.
*F16D 7/02* (2006.01)
(52) U.S. Cl.
CPC ...................... *F16D 7/021* (2013.01)
(58) Field of Classification Search
USPC ....... 464/30; 474/70; 403/371, 372; 384/215, 384/222, 300, 908, 909
See application file for complete search history.

(56) References Cited

U.S. PATENT DOCUMENTS

| | | | |
|---|---|---|---|
| 2,897,026 A | | 7/1959 | Haller et al. |
| 2,931,412 A | | 4/1960 | Wing |
| 3,197,243 A | | 7/1965 | Brenneke |
| 4,222,246 A | | 9/1980 | Rongley |
| 4,790,683 A | | 12/1988 | Cramer, Jr. et al. |
| 4,981,390 A | | 1/1991 | Cramer, Jr. et al. |
| 6,480,363 B1 * | | 11/2002 | Prater |
| 7,658,677 B2 | | 2/2010 | Needes et al. |
| 7,832,933 B2 * | | 11/2010 | Adams et al. |
| 2011/0076096 A1 * | | 3/2011 | Slayne et al. ................ 403/372 |
| 2011/0176757 A1 | | 7/2011 | Heldmann et al. |

FOREIGN PATENT DOCUMENTS

| | | | |
|---|---|---|---|
| WO | 2010035127 A1 | 4/2010 | |
| WO | 2011-036126 A1 | 3/2011 | |
| WO | 2011-073413 A1 | 6/2011 | |

OTHER PUBLICATIONS

International Search Report for PCT/US2013/076078 dated Apr. 17, 2014, 1 page.

* cited by examiner

*Primary Examiner* — Gregory Binda
(74) *Attorney, Agent, or Firm* — Abel Law Group, LLP; Chi Suk Kim (57) ABSTRACT

A torque limiting assembly is disclosed and can include a generally cylindrical bearing and a tolerance ring disposed around the generally cylindrical bearing. The torque limiting assembly is configured to be installed between and rotatably couple an inner and an outer component. The torque limiting assembly is configured to rotate with respect to at least one of the inner and outer components when a threshold torque, T, is exceeded.

20 Claims, 5 Drawing Sheets

TORQUE LIMITING ASSEMBLY

CROSS-REFERENCE TO RELATED APPLICATION

The present application claims priority from U.S. Provisional Patent Application No. 61/748,008, filed Dec. 31, 2012, entitled "TORQUE LIMITING ASSEMBLY", naming as inventor Timothy J. Hagan, which application is incorporated by reference herein in its entirety.

FIELD OF THE DISCLOSURE

The present disclosure is directed generally to bearing assemblies, and particularly to torque limiting assemblies.

DESCRIPTION OF THE RELATED ART

The present disclosure relates to torque limiting assemblies, wherein a torque limiter can provide an interference fit between parts of an assembly, in which a first part has a cylindrical portion located in a cylindrical bore of a second part. In particular, the present disclosure relates to torque limiting assemblies that provide a limited interference fit between a cylindrical component such as a shaft and an outer component installed around the shaft.

A torque limiter generally includes a slip member installed around a shaft. Another member can be installed around the slip member and can engage the inner wall of a bore. The shaft and the component formed with the bore can rotate together until a torque limit exceeded. When the torque limit is exceeded, the shaft can slip within the slip member.

The industry continues to need improvements in torque limiting assemblies that can allow limiting angular movement between a shaft and a component installed on the shaft.

BRIEF DESCRIPTION OF THE DRAWINGS

The present disclosure can be better understood, and its numerous features and advantages made apparent to those skilled in the art by referencing the accompanying drawings.

The use of the same reference symbols in different drawings indicates similar or identical items.

DETAILED DESCRIPTION

The following description is directed to bearing assemblies, and particularly, to torque limiting assemblies that can be installed within an air conditioner compressor assembly between a compressor shaft and a bore formed in a compressor pulley. In one aspect, a torque limiting assembly can be fitted around the compressor shaft and then, the compressor pulley can be installed around the torque limiting assembly. Alternatively, the torque limiting assembly can be inserted into the bore formed in the pulley and the compressor shaft can be inserted through the torque limiting tolerance ring.

In a typical installation, the torque limiting assembly can provide a limited interference fit between an inner and an outer component. As such, the inner and outer components can be statically coupled and can rotate together. If a torque between the inner and outer components becomes greater than the force of the interference fit, the inner and outer components can rotate with respect to each other. When the torque between the inner and outer components falls below the force of the interference fit, the two parts can re-engage each other.

A torque limiting tolerance ring according to one or more of the embodiments described herein can include a bearing having a metal substrate and a bearing material disposed thereon. A tolerance ring can surround the bearing and can include a plurality of projections that can extend radially outward from the body of the tolerance ring. The torque limiting assembly can be installed over an inner component, e.g., a shaft or within a bore formed in an outer component, e.g., a pulley. If an operating torque exceeds a threshold the shaft can move with respect to the pulley and slip within the bearing.

Figure 1:
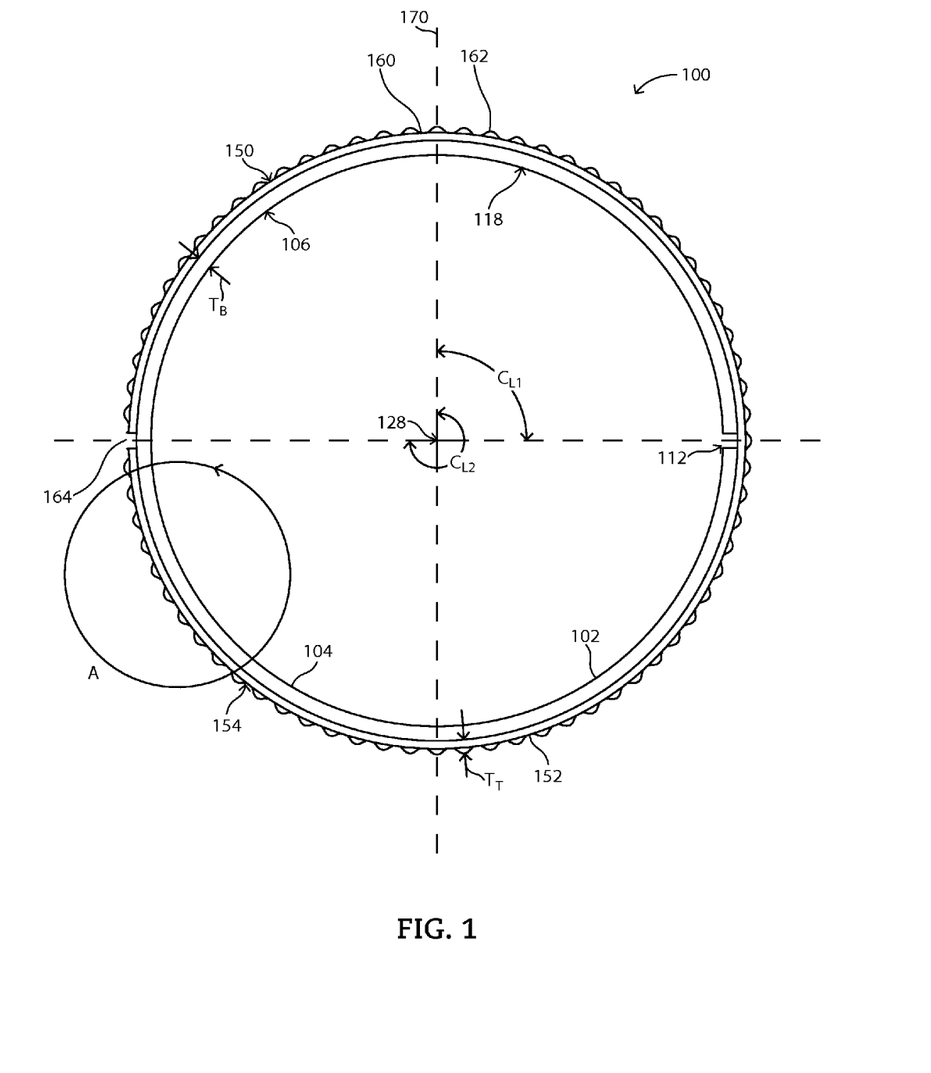
FIG. 1 includes an end plan view of a torque limiting assembly in accordance with an embodiment.
Figure 2:
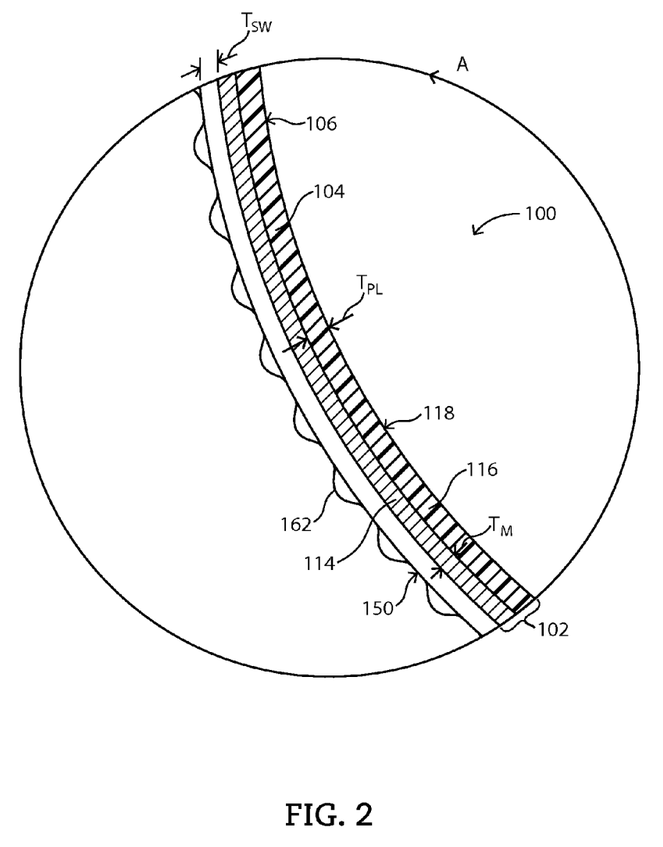
FIG. 2 includes an enlarged end plan view of a section of a torque limiting assembly in accordance with an embodiment as seen in Circle A of FIG. 1.
Figure 3:
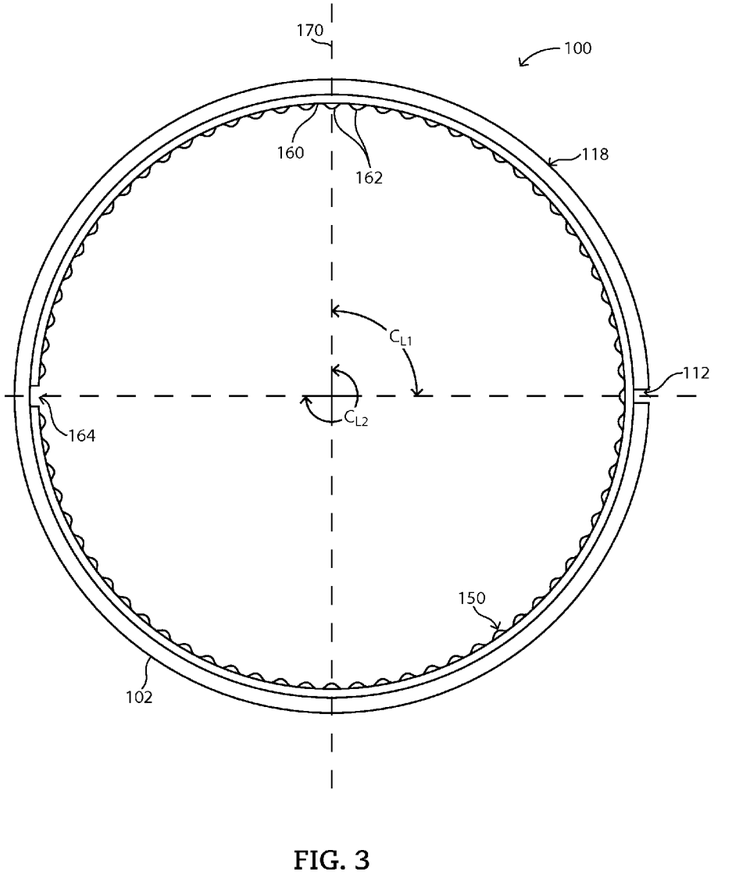
FIG. 3 includes an end plan view of a torque limiting assembly in accordance with an embodiment.
Figure 4:
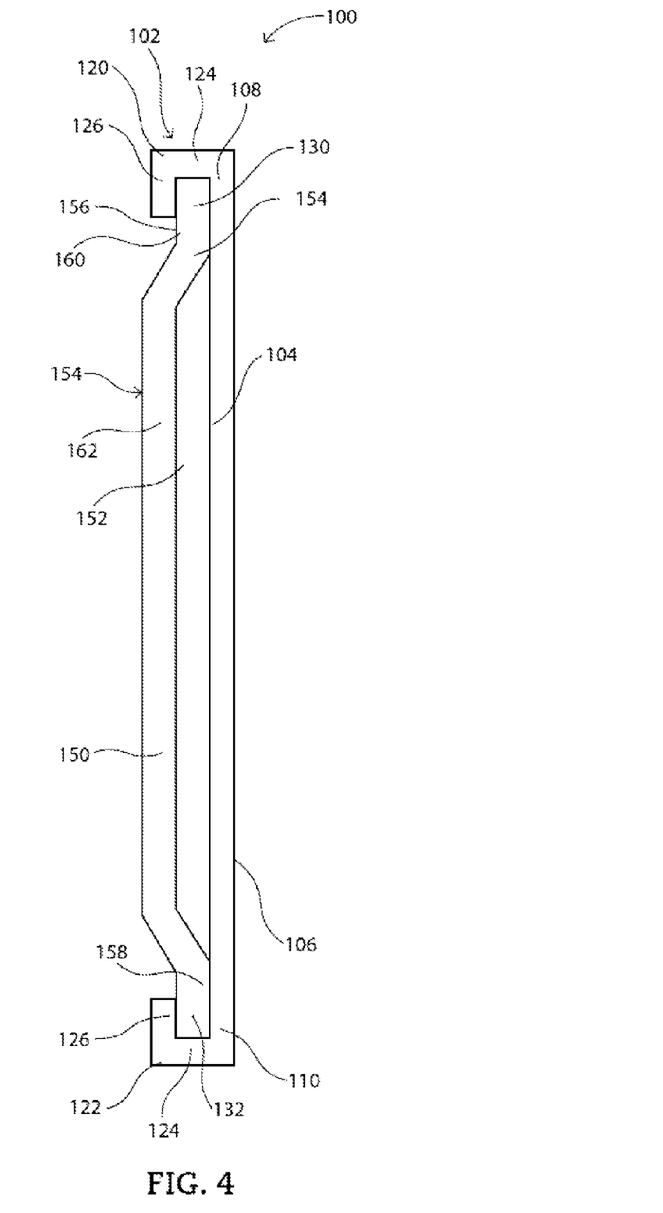
FIG. 4 includes a cross-sectional view of a torque limiting assembly in accordance with an embodiment.

Referring initially to FIGS. 1 to 3, a torque limiting assembly is shown and is generally designated 100. FIG. 4 illustrates a cross-sectional view of the torque limiting assembly 100.

As illustrated in FIGS. 1 through 4, the torque limiting assembly 100 can include a bearing 102 having a generally cylindrical body 104. The body 104 can include a sidewall 106 that can include a first axial end 108 and a second axial end 110. A gap 112, e.g., a first gap, can be formed in the sidewall 106 of the body 104. The gap 112 can extend along the entire axial length of the sidewall 106 of the body 104 to form a split in the bearing 102.

In a particular aspect, as shown in FIG. 2, the bearing 102 can include a laminate having a substrate 114 and a polymer layer 116. In a particular aspect, the substrate 114 can comprise a metal. The bearing 102 can be shaped into a cylinder as shown and can include an inner shaft contact surface 118. The inner shaft contact surface 118 can comprise the polymer layer 116. In a particular aspect, the laminate can include a laminate of a fluoropolymer disposed on a metal substrate. The fluoropolymer can be adhered to the substrate using mechanical adhesion or lamination with a fluoropolymer hot melt adhesive. In an exemplary embodiment, the fluoropolymer can include, for example, PTFE, and the substrate can include, for example, aluminum, steel, bronze, copper or alloys thereof. In particular embodiments, the laminate can be essentially free of lead.

In a particular aspect, the polymer layer 116 can include one or more fillers such as graphite, glass, aromatic polyester (EKONOL®), bronze, zinc, boron nitride, carbon and/or polyimide. Moreover, in one aspect, the polymer layer 116 can include both graphite and polyester fillers. Concentrations of each of these fillers in a polymer such as PTFE may be greater than 1%, greater than 5%, greater than 10%, greater than 20% or greater than 25% by weight. Additional layers, such as a bronze mesh between the metal and the fluoropolymer, or embedded in the fluoropolymer, can also be used.

Examples of such materials can include the NORGLIDE® line of products available from Saint-Gobain Performance Plastics Inc. Suitable examples of NORGLIDE products include NORGLIDE PRO, M, SM, T and SMTL. In another aspect, the bearing 102 can include a self lubricating metal bearing material.

In a particular aspect, a thickness of the polymer layer 116 on the bearing 102 can vary around the circumference of the bearing 102. In another aspect, the polymer layer 116 can be substantially uniform on the substrate 114. In a particular aspect, the polymer layer 116 can have a thickness, $T_{PL}$, and $T_{PL}$ can be ≥30 μm, such as ≥50 μm, ≥75 μm or ≥100 μm Moreover, $T_{PL}$ can be ≤250 μm such as ≤200 μm or ≤150 μm. In this aspect, $T_{PL}$ can be within a range between and including any of the maximum and minimum values of $T_{PL}$ described herein.

For example, $T_{PL}$ can be ≥30 μm and ≤250 μm such as ≥30 μm and ≤200 μm or ≥30 μm and ≤150 μm. Further, $T_{PL}$ can be ≥50 μm and ≤250 μm such as ≥50 μm and ≤200 μm or ≥50 μm and ≤150 μm. Further still, $T_{PL}$ can be ≥75 μm and ≤250 μm such as ≥75 μm and ≤200 μm or ≥75 μm and ≤150 μm. Even further, $T_{PL}$ can be ≥100 μm and ≤250 μm such as ≥100 μm and ≤200 μm or ≥100 μm and ≤150 μm.

In another aspect, the substrate 114 can have a thickness, $T_M$, and $T_M$ can be ≥100 μm such as ≥150 μm, ≥200 μm or ≥250 μm. Moreover, $T_M$ can be ≤5.0 mm, such as ≤4.0 mm, or ≤2.0 mm. In this aspect, $T_M$ can be within a range between and including any of the maximum and minimum values of $T_M$ described herein. For example, $T_M$ can be ≥100 μm and ≤5.0 mm, such as ≥100 μm and ≤4.0 mm, or ≥100 μm and ≤2.0 mm. Moreover, $T_M$ can be ≥150 μm and ≤5.0 mm, such as ≥150 μm and ≤4.0 mm, or ≥150 μm and ≤2.0 mm. Additionally, $T_M$ can be ≥200 μm and ≤5.0 mm, such as ≥200 μm and ≤4.0 mm, or ≥200 μm and ≤2.0 mm. Further, $T_M$ can be ≥250 μm and ≤5.0 mm, such as ≥250 μm and ≤4.0 mm, or ≥250 μm and ≤2.0 mm.

As illustrated in FIG. 4, the bearing 102 can include a first flange 120 extending from the first axial end 108 of the bearing 102 and a second flange 122 extending from the second axial end 110. Each flange 120, 122 can include a first portion 124 that can extend radially outward from the first or second axial end 108, 110 of the bearing 102, e.g., away from a center of the bearing 102. Further, each flange 120, 122 can include a second portion 126 that can extend axially in a direction parallel to a center axis 128 (shown in FIG. 1) of the torque limiting assembly 100. In a particular aspect, the first flange 120 can include a first tolerance ring pocket 130 formed around the first axial end 108 of the bearing 102 and the second flange 122 can include a second tolerance ring pocket 132 formed around the second axial end 110 of the bearing 102.

The torque limiting assembly 100 can further include a tolerance ring 150 installed around and engaged with the bearing 102. The tolerance ring 150 can include a generally cylindrical body 152 that can include a sidewall 154. The sidewall 154 can include a first axial end 156 and a second axial end 158. Further, the sidewall 154 can include an unfinished portion 160 and a plurality of projections 162 can extend radially from the unfinished portion 160, e.g., radially outward.

In another aspect, as shown in FIG. 3, the bearing 102 can be installed around the tolerance ring 150 such that the contact surface 118 is an outer contact surface and the tolerance ring 150 can have projections 162 that extend radially inward.

In either aspect, i.e., the projections 162 extend radially inward or radially outward, each projection 162 can extend from the unformed portion 160 and each projection 162 can be surrounded by the unformed portion 160 of the tolerance ring 150.

As indicated in FIGS. 1 to 3, the tolerance ring 150 can include a gap 164, e.g., a second gap, formed in the sidewall 154 of the tolerance ring 150. The gap 164 can extend along the entire axial length of the sidewall 154 to form a split in the tolerance ring 150.

As depicted in FIG. 4, the tolerance ring 150 can be installed on the bearing 102 so that the first axial end 156 of the tolerance ring 150 fits into the first tolerance ring pocket 130 formed on the first axial end 108 of the bearing 102 and the second axial end 158 of the tolerance ring 150 fits into the second tolerance ring pocket 132 formed on the second axial end 110 of the bearing 102. Moreover, the unformed portion 160 of the tolerance ring 150 can engage the metal substrate 116 of the bearing 102.

As depicted, the tolerance ring 102 is axially affixed between the first and second flanges 120, 122 of the bearing 102. Moreover, the first axial end 156 of the tolerance ring 150 can be engaged with, or abut, the first portion 124 of the first flange 120 on the bearing 102 and the second axial end 158 of the tolerance ring 150 can be engaged with, or abut, the first portion 124 of the second flange 122 on the bearing 102. The second portion 126 of the first flange 120 can be folded over the first axial end 156 of the tolerance ring 150 and the second portion 126 of the second flange 122 can be folded over the second axial end 158 of the tolerance ring 150.

In a particular aspect, the axial ends 156, 158 of the tolerance ring 150 can be affixed to the flanges 122, 124 of the bearing 102. For example, each one of the flanges 122, 124 can be crimped onto a respective axial end 156, 158 of the tolerance ring 150. Moreover, each flange 122, 124 can be welded to a respective axial end 156, 158 of the tolerance ring 150.

Referring again to FIGS. 1 and 3, the gap 112 formed in the bearing 102 can be located in a circumferential location, $C_{L1}$, measured from a reference axis 170 passing through the center of the torque limiting assembly 100 and bisecting the torque limiting assembly 100. $C_{L1}$ can be within a range between and including 45° and 135°, such as between and including 50° and 130°, between and including 55° and 125°, between and including 60° and 120°, between and including 65° and 115°, between and including 70° and 110°, between and including 75° and 105°, between and including 80° and 100°, or between and including 85° and 95°. In another aspect, $C_{L1}$ can be essentially 90°.

As illustrated, the gap 164 formed in the tolerance ring 150 can be located in a circumferential location, $C_{L2}$, measured from the reference axis 170. In particular embodiments, $C_{L2}$ can be within a range between and including 225° and 315°, such as between and including 230° and 310°, between and including 235° and 305°, between and including 240° and 300°, between and including 245° and 295°, between and including 250° and 290°, between and including 255° and 285°, between and including 260° and 280°, or between and including 265° and 275°. In another aspect, $C_{L2}$ can be essentially 270°.

Further, the gap 112 and the gap 164 can be diametrically opposed. In other words, the gap 112 and the gap 164 can lie essentially along a line passing through a center of the torque limiting assembly 100 on opposite sides of the torque limiting assembly 100.

In a particular aspect, the bearing 102 can include an overall thickness, $T_B$, and the tolerance ring can comprise an overall thickness, $T_T$, as measured by a maximum thickness (e.g., from the tolerance ring sidewall to the apex of the projections 162). In this aspect, $T_B$ can be ≥10% $T_T$, such as ≥25% $T_T$, ≥50% $T_T$, ≥75% $T_T$, or ≥100% $T_T$. Further, $T_B$ can be ≤500% $T_T$, such as ≤450% $T_T$, ≤400% $T_T$, ≤300% $T_T$, or ≤200% $T_T$. In another aspect, $T_B$ can be within a range between and including any of maximum and minimum values of $T_B$ described above.

For example, $T_B$ can be ≥10% $T_T$ and ≤500% $T_T$, such as ≥10% $T_T$ and ≤450% $T_T$, ≥10% $T_T$ and ≤400% $T_T$, ≥10% $T_T$ and ≤300% $T_T$, or ≥10% $T_T$ and ≤200% $T_T$. $T_B$ can be ≥25% $T_T$ and ≤500% $T_T$, such as ≥25% $T_T$ and ≤450% $T_T$, ≥25% $T_T$ and ≤400% $T_T$, ≥25% $T_T$ and ≤300% $T_T$, or ≥25% $T_T$ and ≤200% $T_T$. $T_B$ can be ≥50% $T_T$ and ≤500% $T_T$, such as ≥50% $T_T$ and ≤450% $T_T$, ≥50% $T_T$ and ≤400% $T_T$, ≥50% $T_T$ and ≤300% $T_T$, or ≥50% $T_T$ and ≤200% $T_T$. $T_B$ can be ≥75% $T_T$ and ≤500% $T_T$, such as ≥75% $T_T$ and ≤450% $T_T$, ≥75% $T_T$ and ≤400% $T_T$, ≥75% $T_T$ and ≤300% $T_T$, or ≥75% $T_T$ and ≤200% $T_T$. Moreover, $T_B$ can be ≥100% $T_T$ and ≤500% $T_T$, such as ≥100% $T_T$ and ≤450% $T_T$, ≥100% $T_T$ and ≤400% $T_T$, ≥100% $T_T$ and ≤300% $T_T$, or ≥100% $T_T$ and ≤200% $T_T$.

In another aspect, the polymer layer 116 can have a thickness, $T_{PL}$, and the tolerance ring 150 can include a sidewall thickness, $T_{SW}$, as measured through an unformed portion 160 of the tolerance ring 150. $T_{PL}$ can be ≥1% $T_{SW}$, such as ≥5% $T_{SW}$, ≥10% $T_{SW}$, ≥50% $T_{SW}$, or ≥75% $T_{SW}$. Further, $T_{PL}$ can be ≤500% $T_{SW}$, such as ≤450% $T_{SW}$, ≤400% $T_{SW}$, ≤300% $T_{SW}$, or ≤200% $T_{SW}$. In another aspect, $T_{PL}$ can be within a range between and including any of the maximum or minimum values of $T_{PL}$ described herein.

For example, $T_{PL}$ can be ≥1% $T_{SW}$ and ≤500% $T_{SW}$, such as ≥1% $T_{SW}$ and ≤450% $T_{SW}$, ≥1% $T_{SW}$ and ≤400% $T_{SW}$, ≥1% $T_{SW}$ and ≤300% $T_{SW}$, or ≥1% $T_{SW}$ and ≤200% $T_{SW}$. $T_{PL}$ can be ≥5% $T_{SW}$ and ≤500% $T_{SW}$, such as ≥5% $T_{SW}$ and ≤450% $T_{SW}$, ≥5% $T_{SW}$ and ≤400% $T_{SW}$, ≥5% $T_{SW}$ and ≤300% $T_{SW}$, or ≥5% $T_{SW}$ and ≤200% $T_{SW}$. $T_{PL}$ can be ≥10% $T_{SW}$ and ≤500% $T_{SW}$, such as ≥10% $T_{SW}$ and ≤450% $T_{SW}$, ≥10% $T_{SW}$ and ≤400% $T_{SW}$, ≥10% $T_{SW}$ and ≤300% $T_{SW}$, or ≥10% $T_{SW}$ and ≤200% $T_{SW}$. $T_{PL}$ can be ≥50% $T_{SW}$ and ≤500% $T_{SW}$, such as ≥50% $T_{SW}$ and ≤450% $T_{SW}$, ≥50% $T_{SW}$ and ≤400% $T_{SW}$, ≥50% $T_{SW}$ and ≤300% $T_{SW}$, or ≥50% $T_{SW}$ and ≤200% $T_{SW}$. $T_{PL}$ can be ≥75% $T_{SW}$ and ≤500% $T_{SW}$, such as ≥75% $T_{SW}$ and ≤450% $T_{SW}$, ≥75% $T_{SW}$ and ≤400% $T_{SW}$, ≥75% $T_{SW}$ and ≤300% $T_{SW}$, or ≥75% $T_{SW}$ and ≤200% $T_{SW}$. Further, $T_{PL}$ can be ≥100% $T_{SW}$ and ≤500% $T_{SW}$, such as ≥100% $T_{SW}$ and ≤450% $T_{SW}$, ≥100% $T_{SW}$ and ≤400% $T_{SW}$, ≥100% $T_{SW}$ and ≤300% $T_{SW}$, or ≥100% $T_{SW}$ and ≤200% $T_{SW}$.

Figure 5:
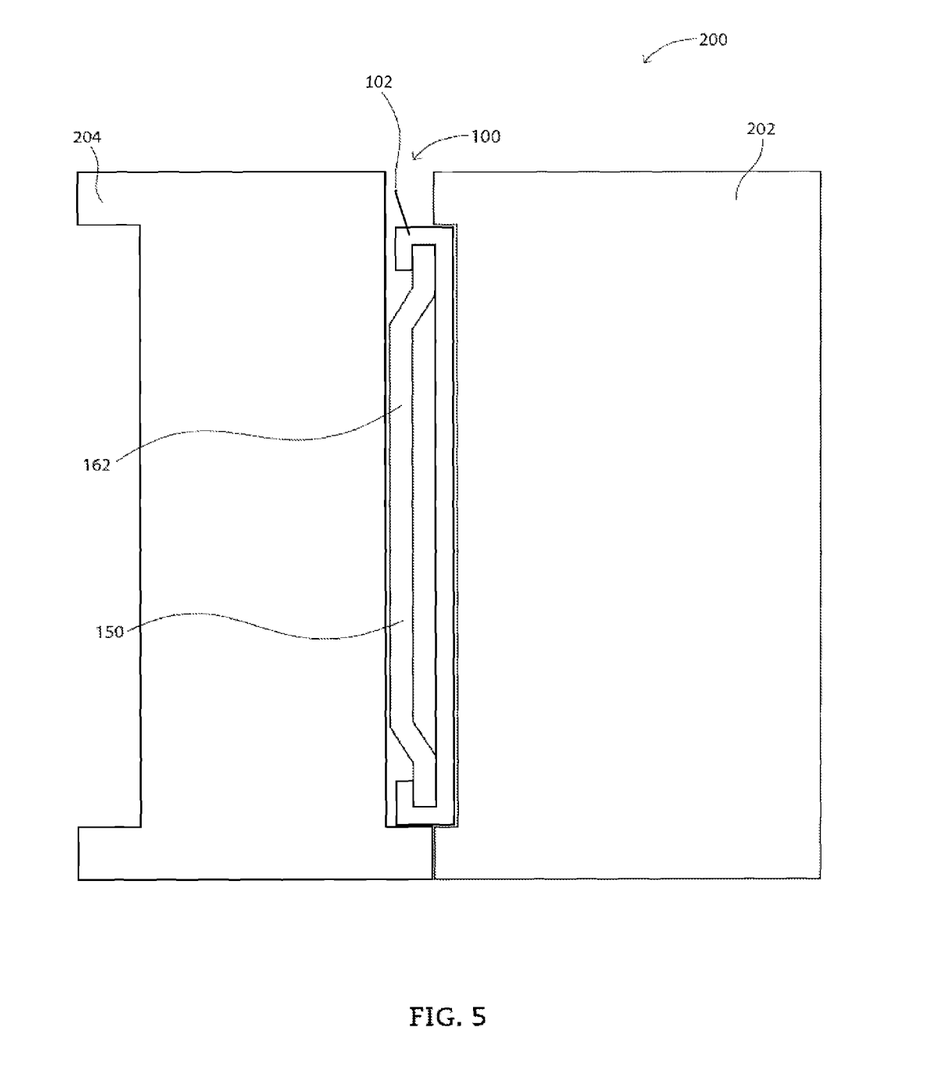
FIG. 5 includes a cross-sectional view of a torque limiting assembly deployed in a rotating assembly in accordance with an embodiment.

FIG. 5 shows the torque limiting assembly 100 deployed in a rotating assembly 200. The rotating assembly 200 can include an inner component 202 and an outer component 204. The torque limiting assembly 100 can be installed there between. During use, if a threshold torque, T, is exceeded the inner component 202 can slip within the bearing 102 of the torque limiting assembly 100. Otherwise, the inner component 102 can remain statically coupled to the outer component 204. When installed in compression between the inner component 202 and the outer component 204, the radial forces provided by the projections 162 formed on the tolerance ring 150 can provide a substantial normal force on the outer component 204. The normal forces provided by the tolerance ring 150 can provide a clamping force that can overcome the relatively low friction between the bearing 102 and the inner component 202 and can essentially increase the static friction, $F_S$, or traction between the bearing 102 and the inner component 202. However, the dynamic friction, $F_D$, between the bearing 102 and inner component 202 can remain substantially lower than $F_S$ and if the torque, T, between the inner and outer components 202, 204 exceeds a threshold, the inner component 202 can begin to slip within the torque limiting assembly 100. As the inner component 202 slips the relatively low dynamic friction $F_D$ will further promote slipping and will allow the shaft to rotate relatively easily within the torque limiting assembly 100. Thereafter, if the torque is reduced the normal forces can overcome the relatively low $F_D$ and act as a brake on the inner component 202 until the $F_D$ is completely overcome and $F_S$ is reinstated.

In a particular aspect, $F_S$ can be ≥$F_D$, such as ≥2 $F_D$, ≥5 $F_D$, or ≥10 $F_D$. In another aspect, $F_S$ can be ≤100 $F_D$, such as ≤75 $F_D$, ≤50 $F_D$, or ≤25 $F_D$. $F_S$ μm can be within a range between and including any of the values of $F_S$ described herein. For example, $F_S$ can be ≥2 $F_D$ and ≤100 $F_D$, such as ≥2 $F_D$ and ≤75 $F_D$, ≥2 $F_D$ and ≤50 $F_D$, or ≥2 $F_D$ and ≤25 $F_D$. $F_S$ can be ≥5 $F_D$ and ≤100 $F_D$, such as ≥5 $F_D$ and ≤75 $F_D$, ≥5 $F_D$ and ≤50 $F_D$, or ≥5 $F_D$ and ≤25 $F_D$. $F_S$ can be ≥10 $F_D$ and ≤100 $F_D$, such as ≥10 $F_D$ and ≤75 $F_D$, ≥10 $F_D$ and ≤50 $F_D$, or ≥10 $F_D$ and ≤25 $F_D$.

The radial forces depend greatly on the wall thickness of the tolerance ring 150. As the wall thickness is increased and the radial force spring rate increases the thickness of the polymer layer 116 on the bearing can be increased.

Accordingly, the torque limiting assembly 100 can be used in relatively high torque applications, e.g., greater than 4,000 revolutions per minute (RPM), and can substantially minimize variations in the torque by allowing the shaft to slip at even higher torques that can occur in such application.

In a particular aspect, the rotating assembly 200 can be an air conditioner compressor assembly, e.g., a belt driven air conditioner compressor assembly for a motor vehicle. Further, in this particular aspect, the inner component 202 can be a compressor shaft extending from an air conditioner compressor and the outer component 204 can be a compressor pulley installed around the compressor shaft. A drive belt (not shown) can extend at least partially around the outer circumference of the compressor pulley.

As the belt moves, the compressor pulley can rotate. In the engaged configuration, with the compressor shaft statically coupled to the compressor pulley, the compressor shaft can also rotate. In the event of a failure within the air compressor, e.g., a bearing seizure, and the compressor shaft can seize within the air compressor and stop rotating. If the shaft seizes, a torque within the compressor shaft/compressor pulley assembly can exceed a threshold torque and the shaft can rotate within the bearing without damaging the pulley.

Accordingly, as the torque remains above the threshold value, the bearing 102 can allow the shaft to rotate therein without risk of serious damage. As such, the risk of damage to the drive belt, the compressor pulley, or other components driving the belt or being driven by the drive belt, can be substantially reduced.

In a particular aspect, the tolerance ring portion 150 of the torque limiting assembly 100 can be made from a metal, a metal alloy, or a combination thereof. The metal can include a ferrous metal. Further, the metal can include steel. The steel can include stainless steel, such as austenitic stainless steel. Moreover, the steel can include stainless steel comprising chrome, nickel, or a combination thereof. For example, the steel can X10CrNi18-8 stainless steel. Further, the tolerance ring can include a Vickers pyramid number hardness, VPN, which can be ≥350, such as ≥375, ≥400, ≥425, or ≥450. VPN can also be ≤500, ≤475, or ≤450. VPN can also be within a range between, and including, any of the VPN values described herein. In another aspect, the tolerance ring can be treated to increase its corrosion resistance. In particular, the tolerance ring can be passivated. For example, the tolerance ring can be passivated according to the ASTM standard A967.

In another aspect, the stock material from which the tolerance ring can be formed can have a thickness, t, and t can be ≥0.05 mm, such as ≥0.1 mm, ≥0.2 mm, ≥0.3 mm, or ≥0.4 mm. In another aspect, t can be ≤1.0 mm, such as ≤0.75 mm, or ≤0.5 mm. Moreover, t can be within a range between, and including, any of the maximum and minimum values of t disclosed above.

For example, t can be ≥0.05 mm and ≤1.0 mm, such as ≥0.05 mm and ≤0.75 mm, or ≥0.05 mm and ≤0.5 mm. Further, t can be ≥0.1 mm and ≤1.0 mm, such as ≥0.1 mm and ≤0.75 mm, or ≥0.1 mm and ≤0.5 mm. In another aspect, t can be ≥0.2 mm and ≤1.0 mm, such as ≥0.2 mm and ≤0.75 mm, or ≥0.2 mm and ≤0.5 mm. Moreover, t can be ≥0.3 mm and ≤1.0 mm, such as ≥0.3 mm and ≤0.75 mm, or ≥0.3 mm and ≤0.5 mm. In addition, t can be ≥0.4 mm and ≤1.0 mm, such as ≥0.4 mm and ≤0.75 mm, or ≥0.4 mm and ≤0.5 mm.

The tolerance ring according to any of the aspects described herein may have an overall outer diameter, OD, and OD can be ≥5 mm, such as ≥10 mm, ≥20 mm, ≥30 mm, or ≥40 mm. The OD can be ≤100 mm, such as ≤90 mm, ≤80 mm, ≤70 mm, ≤60 mm, or ≤50 mm. OD can be within a range between and including any of the maximum and minimum values of OD described herein.

For example, OD can be ≥5 mm and ≤100 mm, such as ≥5 mm and ≤90 mm, ≥5 mm and ≤80 mm, ≥5 mm and ≤70 mm, ≥5 mm and ≤60 mm, or ≥5 mm and ≤50 mm. OD can be ≥10 mm and ≤100 mm, such as ≥10 mm and ≤90 mm, ≥10 mm and ≤80 mm, ≥10 mm and ≤70 mm, ≥10 mm and ≤60 mm, or ≥10 mm and ≤50 mm. OD can be ≥20 mm and ≤100 mm, such as ≥20 mm and ≤90 mm, >20 mm and ≤80 mm, ≥20 mm and ≤70 mm, ≥20 mm and ≤60 mm, or ≥20 mm and ≤50 mm. Further, OD can be ≥30 mm and ≤100 mm, such as ≥30 mm and ≤90 mm, ≥30 mm and ≤80 mm, ≥30 mm and ≤70 mm, ≥30 mm and ≤60 mm, or ≥30 mm and ≤50 mm. Additionally, OD can be ≥40 mm and ≤100 mm, such as >40 mm and ≤90 mm, ≥40 mm and ≤80 mm, >40 mm and ≤70 mm, >40 mm and ≤60 mm, or ≥40 mm and ≤50 mm.

In another aspect, the tolerance ring can have an overall axial length, L, and L can be ≥5 mm, such as ≥10 mm, or ≥15 mm. Additionally, L can be ≤50 mm, such as ≤40 mm, ≤30 mm, or ≤20 mm. Moreover, L can be within a range between and including any of the maximum and minimum values of L described above.

For example, L can be ≥5 mm and ≤50 mm, such as ≥5 mm and ≤40 mm, ≥5 mm and ≤30 mm, or ≥5 mm and ≤20 mm. Further, L can be ≥10 mm and ≤50 mm, such as ≥10 mm and ≤40 mm, ≥10 mm and ≤30 mm, or ≥5 mm and ≤20 mm. Still further, L can be ≥15 mm and ≤50 mm, such as ≥15 mm and ≤40 mm, ≥15 mm and ≤30 mm, or ≥15 mm and ≤20 mm.

In another aspect, each projection can have a radial height, $H_R$, and $H_R$ can be ≥0.3 mm, such as ≥0.4 mm, ≥0.5 mm, ≥0.6 mm, or ≥0.7 mm. $H_R$ can also be ≤1.5 mm, such as ≤1.25 mm, or ≤1 mm. $H_R$ can also be within a range between and including any of the maximum and minimum vales of $H_R$ described herein.

For example, $H_R$ can be ≥0.3 mm and ≤1.5 mm, such as ≥0.3 mm and ≤1.25 mm, or ≥0.3 mm and ≤1 mm. Further, $H_R$ can be ≥0.4 mm and ≤1.5 mm, such as ≥0.4 mm and ≤1.25 mm, or ≥0.4 mm and ≤1 mm. $H_R$ can be ≥0.5 mm and ≤1.5 mm, such as ≥0.5 mm and ≤1.25 mm, or ≥0.5 mm and ≤1 mm. Moreover, $H_R$ can be ≥0.6 mm and ≤1.5 mm, such as ≥0.6 mm and ≤1.25 mm, or ≥0.6 mm and ≤1 mm. In addition, $H_R$ can be ≥0.7 mm and ≤1.5 mm, such as ≥0.7 mm and ≤1.25 mm, or ≥0.7 mm and ≤1 mm.

A skilled artisan can recognize that there may be others applications that can utilize a torque limiting tolerance ring having one or more of the characteristics described herein.

The above-disclosed subject matter is to be considered illustrative, and not restrictive, and the appended claims are intended to cover all such modifications, enhancements, and other embodiments, which fall within the true scope of the present invention. Thus, to the maximum extent allowed by law, the scope of the present invention is to be determined by the broadest permissible interpretation of the following claims and their equivalents, and shall not be restricted or limited by the foregoing detailed description.

In addition, in the foregoing Detailed Description, various features can be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter can be directed to less than all features of any of the disclosed embodiments. Thus, the following claims are incorporated into the Detailed Description, with each claim standing on its own as defining separately claimed subject matter.

Items.

Item 1. A torque limiting assembly comprising:
a generally cylindrical bearing; and
a tolerance ring disposed around the generally cylindrical bearing,
wherein the torque limiting assembly is configured to be installed between an inner component and an outer component, wherein the torque limiting assembly is configured to rotatably couple the inner and the outer components, and wherein the torque limiting assembly is configured to rotate with respect to at least one of the inner and outer components when a threshold torque, T, is exceeded.

Item 2. An assembly, comprising:
an inner component;
an outer component disposed around the inner component; and
a torque limiting assembly disposed between the inner component and the outer component, the torque limiting assembly comprising:
a generally cylindrical bearing; and
a tolerance ring disposed around the generally cylindrical bearing,
wherein the torque limiting assembly rotatably couples the inner and the outer components, and wherein the torque limiting assembly is configured to rotate with respect to at least one of the inner and outer components when a threshold torque, T, is exceeded.

Item 3. An assembly, comprising:
a shaft;
a pulley disposed around the shaft;
a torque limiting assembly installed between the shaft and the pulley, the torque limiting assembly comprising:
a generally cylindrical bearing including a first gap; and
a tolerance ring disposed around the generally cylindrical bearing, the tolerance ring including a second gap,
wherein the torque limiting assembly rotatably couples the shaft and the pulley, and wherein the torque limiting assembly is configured to rotate with respect to at least one of the shaft and the pulley when a threshold torque, T, is exceeded.

Item 4. The assembly according to any one of items 1 or 2, wherein the generally cylindrical bearing includes a first gap, and wherein the tolerance ring includes a second gap Item 5. The assembly according to any one of items 3 or 4, wherein the first gap is located in a circumferential location, $C_{L1}$, as measured by a distance from a reference axis, and $C_{L1}$ is within a range between and including about 45° and about 135°, such as between and including 50° and 130°, between and including 55° and 125°, between and including 60° and 120°, between and including 65° and 115°, between and including 70° and 110°, between and including 75° and 105°, between and including 80° and 100°, or between and including 85° and 95°.

Item 6. The assembly according to item 5, wherein $C_{L1}$, is essentially 90°.

Item 7. The assembly according to any one of items 1, 2, or 3, wherein the second gap is located in a circumferential location, $C_{L2}$, as measured by a distance from a reference axis, and $C_{L2}$ is within a range between and including about 225° and about 315°, such as between and including 230° and 310°, between and including 235° and 305°, between and including 240° and 300°, between and including 245° and 295°, between and including 250° and 290°, between and including 255° and 285°, between and including 260° and 280°, or between and including 265° and 275°.

Item 8. The assembly according to item 7, wherein $C_{L2}$, is essentially 270°.

Item 9. The assembly according to any one of items 1, 2, or 3, wherein the first gap and the second gap are diametrically opposed.

Item 10. The assembly according to any one of items 1, 2, or 3, wherein the first gap and the second gap lie essentially along a line passing through a center of the assembly on opposite sides of the assembly.

Item 11. The assembly according to any one of items 1, 2, or 3, wherein the bearing comprises an overall thickness, $T_B$, and the tolerance ring comprises an overall thickness, $T_T$, and $T_B \geq 10\% T_T$, such as $\geq 25\% T_T$, $\geq 50\% T_T$, $\geq 75\% T_T$, or $\geq 100\% T_T$.

Item 12. The assembly according to item 10, wherein $T_B \leq 500\% T_T$, such as $\leq 450\% T_T$, $\leq 400\% T_T$, $\leq 300\% T_T$, or $\leq 200\% T_T$.

Item 13. The assembly according to any one of items 1, 2, or 3, wherein the generally cylindrical bearing comprises a substrate and a polymer layer disposed on the substrate, wherein the polymer layer comprises a thickness, $T_{PL}$, wherein the tolerance ring comprises a sidewall thickness, $T_{SW}$, and wherein $T_{PL} \geq 1\% T_{SW}$, such as $\geq 5\% T_{SW}$, $\geq 10\% T_{SW}$, $\geq 50\% T_{SW}$, or $\geq 75\% T_{SW}$.

Item 14. The assembly according to item 13, wherein $T_{PL} \leq 500\% T_{SW}$, such as $\leq 450\% T_{SW}$, $\leq 400\% T_{SW}$, $\leq 300\% T_{SW}$, or $\leq 200\% T_{SW}$.

Item 15. The assembly according to item 13, wherein the substrate comprises a metal.

Item 16. The assembly according to item 13, wherein the polymer layer comprises a low friction polymer.

Item 17. The assembly according to any one of items 1, 2, or 3, wherein the generally cylindrical bearing includes a first axial end having a first flange and a second axial end having a second flange, and wherein the tolerance ring is disposed between the first and second flanges.

Item 18. The assembly according to item 17, wherein each flange comprises a first portion extending radially outward from the first or second axial end of the bearing, wherein a first axial end of the tolerance ring is engaged with the first portion of the first flange, and wherein a second axial end of the tolerance ring is engaged with the first portion of the second flange.

Item 19. The assembly according to item 18, wherein each flange comprises a second portion extending axially inward to form a first tolerance ring pocket around the first axial end of the bearing and a second tolerance ring pocket around the second axial end of the bearing, wherein the first axial end of the tolerance ring fits into the first tolerance ring pocket and the second axial end of the tolerance ring fits into the second tolerance ring pocket.

Item 20. The assembly according to item 17, wherein the axial ends of the tolerance ring are affixed to the flanges of the bearing.

Item 21. The assembly according to item 20, wherein the flanges are crimped onto the axial ends of the tolerance ring.

Item 22. The assembly according to item 20, wherein the flanges are welded to the axial ends of the tolerance ring.

Item 23. The assembly according to any one of items 1, 2, or 3, wherein the torque limiting assembly is configured to provide a dynamic frictional force, $F_D$, as measured between the torque limiting assembly and the inner component, wherein the torque limiting assembly is configured to provide a static frictional force, $F_S$, as measured between the torque limiting assembly and the inner component, and wherein $F_S \geq 2 F_D$, such $\geq 5 F_D$, or $\geq 10 F_D$.

Item 24. The assembly according to item 23, wherein $F_S \leq 100 F_D$, such as $\leq 75 F_D$, $\leq 50 F_D$, or $\leq 25 F_D$.

What is claimed is:

1. A torque limiting assembly comprising:
   a generally cylindrical bearing; and
   a tolerance ring disposed around the generally cylindrical bearing,
   wherein the torque limiting assembly is configured to be installed between an inner component and an outer component, wherein the torque limiting assembly is configured to rotatably couple the inner and the outer components, wherein the torque limiting assembly is rotatable with respect to the inner and outer components, wherein the torque limiting assembly is configured to rotate with respect to at least one of the inner and outer components when a threshold torque, T, is exceeded, and wherein the generally cylindrical bearing comprises a polymer layer adapted to contact at least one of the inner and outer components.

2. The assembly according to claim 1, wherein the generally cylindrical bearing comprises an overall thickness, $T_B$, wherein the tolerance ring comprises an overall thickness, $T_T$, and wherein $T_B \geq 10\% T_T$.

3. The assembly according to claim 2, wherein $T_B \leq 500\% T_T$.

4. The assembly according to claim 1, wherein the polymer layer comprises a thickness, $T_{PL}$, wherein the tolerance ring comprises a sidewall thickness, $T_{sw}$, and wherein $T_{pL} \geq 1\% T_{sw}$.

5. The assembly according to claim 1, wherein the generally cylindrical bearing comprises a first gap, wherein the tolerance ring comprises a second gap, and wherein the first gap and the second gap are diametrically opposed.

6. The assembly according to claim 1, wherein the generally cylindrical bearing further comprises a substrate, and wherein the substrate comprises a metal.

7. The assembly according to claim 1, wherein the polymer layer comprises a fluoropolymer.

8. The assembly according to claim 1, wherein the generally cylindrical bearing includes a first axial end having a first flange and a second axial end having a second flange, and wherein the tolerance ring is disposed between the first and second flanges.

9. The assembly according to claim 8, wherein each flange comprises a first portion extending radially outward from the first or second axial end of the bearing, wherein a first axial end of the tolerance ring is engaged with the first portion of the first flange, and wherein a second axial end of the tolerance ring is engaged with the first portion of the second flange.

10. The assembly according to claim 9, wherein the axial ends of the tolerance ring are affixed to the flanges of the generally cylindrical bearing.

11. The assembly according to claim 9, wherein the flanges are crimped onto the axial ends of the tolerance ring.

12. The assembly according to claim 1, wherein the torque limiting assembly is configured to provide a dynamic frictional force, $F_D$, as measured between the torque limiting assembly and the inner component, wherein the torque limiting assembly is configured to provide a static frictional force, $F_S$, as measured between the torque limiting assembly and the inner component, and wherein $F_S \geq 2 F_D$.

13. An assembly, comprising:
an inner component;
an outer component disposed around the inner component; and
a torque limiting assembly disposed between the inner component and the outer component, the torque limiting assembly comprising:
a generally cylindrical bearing; and
a tolerance ring disposed around the generally cylindrical bearing,
wherein the torque limiting assembly rotatably couples the inner and the outer components, wherein the torque limiting assembly is rotatable with respect to the inner and outer components, wherein the torque limiting assembly is configured to rotate with respect to at least one of the inner and outer components when a threshold torque, T, is exceeded, and wherein the generally cylindrical bearing comprises a polymer layer adapted to contact at least one of the inner and outer components.

14. An assembly, comprising:
a shaft;
a pulley disposed around the shaft;
a torque limiting assembly installed between the shaft and the pulley, the torque limiting assembly comprising:
a generally cylindrical bearing including a first gap; and
a tolerance ring disposed around the generally cylindrical bearing, the tolerance ring including a second gap,
wherein the torque limiting assembly rotatably couples the shaft and the pulley, wherein the torque limiting assembly is rotatable with respect to the shaft and pulley, wherein the torque limiting assembly is configured to rotate with respect to at least one of the shaft and the pulley when a threshold torque, T, is exceeded, and wherein the generally cylindrical bearing comprises a polymer layer adapted to contact at least one of the inner and outer components.

15. The assembly according to claim 14, wherein the first gap is located in a circumferential location, $C_{L1}$, as measured by a distance from a reference axis, and $C_{L1}$ is within a range between and including about 45° and about 135°.

16. The assembly according to claim 15, wherein $C_{L1}$, is essentially 90°.

17. The assembly according to claim 15, wherein the second gap is located in a circumferential location, $C_{L2}$, as measured by a distance from a reference axis, and $C_{L2}$ is within a range between and including about 225° and about 315°.

18. The assembly according to claim 17, wherein $C_{L2}$, is essentially 270°.

19. The assembly according to claim 14, wherein the first gap and the second gap are diametrically opposed.

20. The assembly according to claim 14, wherein the first gap and the second gap lie essentially along a line passing through a center of the assembly on opposite sides of the assembly.

* * * * *